United States Patent
Wang (10) Patent No.: US 8,687,165 B2
(45) Date of Patent: Apr. 1, 2014

(54) IMAGING SYSTEM HAVING A LIQUID CRYSTAL ELEMENT FOR SELECTIVELY DEFLECTING A BEAM PATH TO VARY THE FOCAL LENGTH THEREOF

(75) Inventor: Lingli Wang, Bad Kreuznach (DE)

(73) Assignee: Jos. Schneider Optische Werke GmbH, Kreuznach (DE)

( * ) Notice: Subject to any disclaimer, the term of this patent is extended or adjusted under 35 U.S.C. 154(b) by 0 days.

(21) Appl. No.: 13/579,909

(22) PCT Filed: Feb. 16, 2011

(86) PCT No.: PCT/EP2011/000739
§ 371 (c)(1),
(2), (4) Date: Aug. 17, 2012

(87) PCT Pub. No.: WO2011/101130
PCT Pub. Date: Aug. 25, 2011

(65) Prior Publication Data
US 2012/0307165 A1    Dec. 6, 2012

(30) Foreign Application Priority Data

Feb. 17, 2010  (DE) .......................... 10 2010 008 342

(51) Int. Cl.
*G02F 1/13*  (2006.01)
(52) U.S. Cl.
USPC ............... 349/193; 349/2; 349/196; 349/202; 359/253
(58) Field of Classification Search
USPC ........... 349/2, 193, 196, 202; 359/253, 30, 31
See application file for complete search history.

(56) References Cited

U.S. PATENT DOCUMENTS

| | | |
|---|---|---|
| 5,224,198 A | 6/1993 | Jachimowicz et al. |
| 2002/0181126 A1 | 12/2002 | Nishioka |
| 2003/0169516 A1* | 9/2003 | Sekiyama ................... 359/726 |
| 2003/0202730 A1 | 10/2003 | Fujieda et al. |

(Continued)

FOREIGN PATENT DOCUMENTS

| | | |
|---|---|---|
| EP | 0 535 402 A1 | 4/1993 |
| WO | 2007/055742 A2 | 5/2007 |

OTHER PUBLICATIONS

[0001]. J. Jahns: "Integrated optical imagining system", Appl. Opt. 29 (1990) 1998.

*Primary Examiner* — Michael Caley
(74) *Attorney, Agent, or Firm* — IPXLAW Group LLP; Claude A. S. Hamrick (57) ABSTRACT

An imaging system for imaging an object onto an image sensor, and which has a front side facing the object and a rear side facing away from the object, the rear side being arranged behind the front side as viewed from the object. Furthermore, the imaging system has a light entrance device at the front side through which light coming from the object can enter into the imaging system. In this case, the light traverses the beam path between object and image sensor. At least one first and one second optical element are likewise present and are arranged at the rear side in such a way that they can influence the beam path. The light entrance device has an electrically switchable liquid crystal element which deflects the beam path at at least one first angle and a second angle which is different from the first angle depending on the electrical switching state. A discretely switchable focal length change is realized by this electrically effected change in the beam path.

12 Claims, 9 Drawing Sheets

(56) References Cited

U.S. PATENT DOCUMENTS

| | | |
|---|---|---|
| 2004/0108984 A1 | 6/2004 | Ogasawara |
| 2004/0156641 A1 | 8/2004 | Dorschner et al. |
| 2004/0175627 A1* | 9/2004 | Sutherland et al. ............... 430/1 |
| 2006/0119914 A1* | 6/2006 | Sutherland et al. ............. 359/15 |

* cited by examiner

IMAGING SYSTEM HAVING A LIQUID CRYSTAL ELEMENT FOR SELECTIVELY DEFLECTING A BEAM PATH TO VARY THE FOCAL LENGTH THEREOF

FIELD OF THE INVENTION

The invention relates to an imaging system for imaging an object onto an image sensor.

PRIOR ART

The trend in the development of optical modules, in particular for mobile radio devices (cell phones), is increasingly toward a very flat design. In this case, increasingly a construction is preferred in which a plurality of optical elements having selected refractive, diffractive, transmissive or reflective properties are combined with one another in order to realize the desired beam path and to produce an imaging on an image sensor (see FIG. 1; or e.g. J. Jahns: "Integrated optical imaging system", Appl. Opt. 29 (1990) 1998).

The constantly increasing requirements made in respect of the flattest possible construction of the modules impose limits, however, for the previously used devices and systems particularly also with regard to the variability of the focal length.

Problem

The problem addressed by the invention is that of proposing an imaging system for imaging an object onto an image sensor which has a very flat design in combination with the realization of at least two different focal lengths.

Solution

This problem is solved by means of the invention comprising the features of the independent claim. Advantageous developments of the invention are characterized in the dependent claims. The wording of all claims is hereby incorporated by reference in the content of this description. The invention also encompasses all expedient and in particular all mentioned combinations of independent and/or dependent claims.

The imaging system is described in greater detail below.

An imaging system for imaging an object onto an image sensor is proposed. The light traverses overall a beam path between object and image sensor, through a transparent carrier on which one or a plurality of passive or/and active optical components are mounted. The aim of said optical components is to be able to adjust the optical focal length of the system continuously or discretely by changing (switching) the optical distance from the entrance lens to the sensor.

In an imaging system, light is deflected by a spatial arrangement of optical elements. The deflection of the light is achieved by optical elements that use different optical effects, for instance:

a. refraction (change in the direction of the light from one transparent medium into another, provided that the light does not penetrate through the interface between the media perpendicularly);

b. diffraction; and c. reflection (light is thrown back where it impinges on an interface between two media having different optical properties).

The optical elements can be lenses, mirrors, gratings, holograms, and other elements having optical properties which are appropriate for the desired beam path.

The image sensor is situated at the end of the beam path, in the image plane into which the object is imaged with the aid of the elements. Said image sensor is generally embodied as a sensor of the types CCD or CMOS.

The imaging system has a front side facing the object and a rear side facing away from the object, said rear side being arranged behind the front side as viewed from the object.

Situated at the front side is a light entrance device, through which light coming from the object can enter into the imaging system. Said light entrance device can be embodied e.g. as a plane or curved surface, as a lens system, as a diffractive optical element. These elements can likewise be optically active or passive.

The imaging system also comprises at least one first and one second optical element. These are arranged at the rear side of the imaging system in such a way that they can influence the beam path.

The light entrance device has an electrically switchable liquid crystal element, which deflects the beam path at at least one first angle and a second angle, which is different from the first, depending on the electrical switching state.

In this case, the beam path impinges on the first optical element at the rear side at the first angle and on the second optical element at the rear side at the second angle.

The electrically switchable liquid crystal element serves for realizing at least two different focal lengths of the imaging system. In the proposed solution, the different focal lengths are set by the change (deflection) of the beam path from passing through the light entrance device. In this case, the beam path is altered such that it passes in each case via other optical elements from among the optical elements arranged in the imaging system, i.e. the appropriate optical elements are used for the respectively desired beam path or the respectively desired focal length.

In short: a change in direction brings about firstly a change in the optical path length and secondly the "inclusion" of additional or new optical elements in the beam path.

The concrete beam path within the system is dependent on how many optical elements are arranged in the beam path and will be influenced by their specific optical properties. The imaging quality can be influenced or improved by a plurality of optical elements, also at the front side. The rays traverse the various optical elements along the beam path. In general, the rays are in this case alternately reflected at the front side and rear side, as a result of which a "folding" of the beam path is realized.

One possibility for the embodiment of the electrically switchable liquid crystal element of the light entrance device is to design said element such that a periodic grating of regions of a liquid crystal with ordered alignment of liquid crystal molecules can be formed in said element by an electrical driving arrangement. As a result, entering light can be deflected at a specific angle depending on the switching state and take a predefined beam path corresponding to a specific focal length.

On account of the diffraction effects at a grating, this procedure functions best for monochromatic light. For colored light it is necessary to compensate for the dispersion of the diffraction grating, thus e.g. by means of a second diffraction grating or else by means of a refractive element (e.g. a prism).

Monochromatic light (Greek: mono-chromos—"one color") is light radiation having a wavelength defined as precisely as possible. The color stimulus of monochromatic light is designated as spectral color. Monochromatic light can be produced in various ways; by way of example, it can be filtered out of polychromatic light with the spectral distribution thereof. The bandwidth of monochromatic light will be as small as possible; however, it can never disappear completely.

A liquid crystal is a substance which on the one hand is liquid, like a liquid substance, but on the other hand also has direction-dependent (anisotropic) physical properties, like a crystal. This particular combination of fluidity and anisotropy makes liquid crystals technologically interesting, primarily for liquid crystal screens, but also increasingly for use in optical elements, e.g. in liquid crystal lenses. Liquid crystals generally exhibit their properties when dissolved in a suitable solvent, often e.g. water. Most liquid crystals are optically birefringent.

Thermotropic liquid crystals are usually used in optics. These liquid crystals occur during the heating of specific substances upon melting as an intermediate phase (mesophase) between the solid phase and liquid phase. Substances of this type can, as the temperature increases, successively form a plurality of different liquid crystalline phases that differ significantly from one another in terms of their microscopic structure and their macroscopic appearance, thus e.g.
  a. the nematic phases,
  b. the smectic phases,
  c. the columnar phases.

The nematic phase is the simplest type of liquid crystalline phases. The nematic phase is generally formed from a system comprising elongated, cigar-shaped molecules. In this phase said molecules have an orientational order with respect to a so-called director, the unit vector of direction. The ensuring preferred orientation is generally constant only for small volumes. The preferred orientations of the small volumes are statistically distributed. No long-range order whatsoever occurs. An isotropic distribution appears to be present on a macroscopic scale.

Generally, the degree of order of the liquid crystal molecules and the associated long-range orientational order decrease as the temperature increases. Accordingly, the physical properties, such as e.g. the refractive index, are dependent on temperature.

However, the molecules of a nematic phase can be aligned by an electric field. The preferred directions in the small volumes are thereby aligned in the same direction, as a result of which a macroscopically anisotropic order arises. This field-induced alignment takes place without temperature changes, i.e. within the nematic phase, without a temperature-induced phase transition.

In the macroscopically ordered phase, the refractive index is increased for the polarization direction parallel to the orientation of the molecules of the liquid crystal. Light polarized perpendicular to the alignment is blocked or greatly absorbed.

The targeted alignment of the liquid crystal molecules by an electrical circuit arrangement and thus the change in the refractive index are effected by electrodes fitted to the liquid crystal element. Said electrodes are connected to one or a plurality of voltage sources which can be switched on and off independently of one another.

The electrodes are applied over the entire area of the liquid crystal element in a manner structured according to the desired function. When the voltage is switched on, an electric field is generated by means of the electrodes at the liquid crystal element, said electric field causing a regionally changed alignment of the preoriented liquid crystal molecules. Consequently, regions having a different refractive index arise in the liquid crystal element. In this case, the refractive index is increased in the regions with orientation of the liquid crystal molecules by means of the electric field for a suitable polarization direction.

In the case of the light entrance device proposed, in accordance with the structure of the application of the electrodes on the liquid crystal element, when the voltage is switched on at the electrodes in the liquid crystal element e.g. the structure and effect of an optical grating is produced.

An optical grating is a strictly periodic arrangement of parallel, equidistant slits, the mutual spacing of which is of the order of magnitude of the light wavelength. This spacing is designated as the grating constant g.

By means of an optical grating, light radiation can be decomposed with high resolution according to wavelengths and a diffraction spectrum can be produced. In the diffraction spectrum, the deflection angle α increases with the wavelength λ of the light in accordance with $$\sin\alpha = \frac{\lambda}{g}$$

for the first diffraction maximum or the first order of diffraction.

With the aid of the optical grating produced electrically in the liquid crystal element, it is thus possible to achieve a targeted deflection of the light ray and thus a change in the beam path through the system. As a result of this change in the beam path, different focal lengths can be produced. In this case, the beam path passes via the optical elements of the imaging system which are necessary or suitable for obtaining a specific focal length.

In the case of the liquid crystal element, the liquid crystal is enclosed by a—where necessary—transparent housing. The electrodes are applied into or the onto said housing. Said electrodes are generally embodied as ITO conductor tracks that can be combined with corresponding voltage sources to form different conductor tracks. ITO (indium tin oxide) is a semiconducting substance that is largely transparent in visible light. The material ITO is also preferably used, inter alia for the production of transparent electrodes in liquid crystal screens.

In one advantageous embodiment of the imaging system proposed, the electrical driving arrangement is embodied in such a way that it can form in the liquid crystal element gratings of regions of the liquid crystal with ordered alignment of liquid crystal molecules with different grating periods.

The different grating periods (grating constants) can be produced, inter alia, by virtue of the fact that the electrodes applied on or at the liquid crystal element are combined to form different conductor tracks. It is thus possible, by activating different conductor tracks, to change the distances between the ordered regions of the liquid crystal. The grating constant g and—in an electrically switchable manner—the deflection angle α change as a result. This embodiment of the proposed imaging system makes it possible to switch between at least three focal lengths of the imaging system:
  a. without applied voltage,
  b. with applied voltage and first grating constant, and
  c. with applied voltage and second grating constant.

A further embodiment of the imaging system is advantageously designed in such a way that the light entrance device has a lens and a liquid crystal element.

It is advantageous that this combination of lenses or lens groups and liquid crystal element can be designed in such a way that the lens or lens group is arranged on the outer side of the system, while the liquid crystal element is situated on the inner side of the light entrance device of the imaging system.

The liquid crystals in the above-described combination of a lens with a liquid crystal element can be aligned in different directions in the grating produced in a manner dependent on the arrangement of the ITO electrodes at the liquid crystal element when the voltage is switched on.

If the electrodes are mounted on the top side and underside of the liquid crystal element then this results in an alignment of the liquid crystals along the optical axis of the lens. In this case, the achieved change in the refractive index is relatively small, but it is independent of the polarization direction of the incident light radiation.

Ferroelectric liquid crystal systems can also be used instead of nematic liquid crystal systems.

In connection with a change made to the beam path within the imaging system, it should be assumed that in a manner governed by diffraction (diffraction order 0) upon passage through the light entrance device an attenuated "residual light radiation" remains, which would pass through the imaging system along the original beam path. In order to avoid this, between the light entrance device and the first optical element of the imaging system it is possible to arrange a blocking arrangement (e.g. slide, shutter or the like) which prevents the "residual light radiation" from passing along the original beam path. The activation/deactivation of said blocking arrangement should be effected simultaneously with the switching of the voltage for changing the beam path.

The liquid crystal element can be the grating mentioned above; however, there can also be other liquid crystal elements, such as are mentioned further below.

The light entrance device can also have a Fresnel element and a liquid crystal element, wherein the light entrance device in this configuration is also suitable for influencing the beam path for polychromatic light.

The term polychromatic light (Greek: polychromos, meaning virtually "multicolored") or white light denotes light which consists of a mixture of different colors. Polychromatic light is a mixture of many wavelengths.

By way of example, Fresnel lenses or Fresnel gratings or Fresnel prisms are appropriate as Fresnel elements.

A Fresnel lens or more precisely a Fresnel stepped lens is an optical lens in which weight and volume are reduced by comparison with a customary optical lens with the same diameter and the same focal length. This has an effect particularly in the case of lenses having a short focal length, which in a normal form are very thick and heavy. In Fresnel lenses, the volume is reduced by division into ring-shaped regions. The thickness is reduced in each of these regions, such that the lens acquires a series of ring-shaped steps. Since light is refracted only when passing through the lens surfaces, the angle of refraction is not dependent on the thickness, but rather only on the angle between the two surfaces. The lens maintains its focal length, but the imaging quality is slightly impaired by the stepped structure. A Fresnel grating (more accurately Fresnel prism) is a parallel arrangement of glass wedges, similar to a Fresnel lens, but not with a circular arrangement, but rather with one that extends parallel. A Fresnel grating (more accurately Fresnel prism) can deflect polychromatic light at a predefined angle.

A combination of Fresnel lens and Fresnel prism is possible and simultaneously brings about a lens effect and a deflection effect.

A computer generated optical element or computer generated hologram (CGH) can be used as a general optical element for the deflection and shape alteration of optical beams. Almost any desired beam shapes and beam directions can thus be generated.

Computer generated holograms (CGH) are important elements in modern optics for generating application-specific optical fields and functions. With the aid of micro- and nano-structures, predefined wavefronts that cannot be realized by methods of traditional optics are produced with these elements. CGHs are employed, inter alia in the interferometric testing of high-precision aspherical lenses or for splitting an illumination beam into a multiplicity of equally bright spots.

A computer generated hologram is an individually calculated hologram which is written to a functional layer after calculation.

CGHs are realized, for example, with high accuracy in plastics substrates. A CGH can be stored as a phase hologram by changing the local optical properties of a polymer carrier, for example. The different local optical properties of the individual dots can be reflection properties, for example as a result of surface topography, or varying optical path lengths in the material of the functional layer (refractive indices), of the material. The desired local optical properties of the individual dots are calculated by a computer.

Such computer generated holograms consist of one or more layers of dot matrices or dot distributions. In this case, the dot distribution can be embodied as an amplitude hologram or phase hologram.

The imaging system can advantageously be designed in such a way that the light entrance device has a computer generated hologram (CGH) and a liquid crystal element. This arrangement is also suitable for influencing the beam path for polychromatic light.

If a Fresnel element or a CGH is covered with a liquid crystal, then the refractive index of the liquid crystal can be electrically switched. It can be switched e.g. such that first there is a jump in refractive index between the material of the Fresnel element and the liquid crystal, as a result of which the Fresnel element has an effect. In the other switching state, the refractive index difference can disappear, such that the Fresnel element does not have an effect. In this way, the effect of the Fresnel lens can be switched on and off. By way of example, a Fresnel grating deflects the light in the switched-on state, and the imaging system thus has a first focal length. In the switched-off state, by way of example, no deflecting effect occurs, and the imaging system thus has a second focal length.

In a manner similar to that in the case of a Fresnel grating, the effect of the CGH can be switched on and off. An additional factor is that in the case of a holographic diffuser the deflection angle can be controlled by means of the electrical voltage applied to the liquid crystal. This opens up further possibilities for realizing focal lens.

Further details and features will become apparent from the following description of preferred exemplary embodiments in conjunction with the dependent claims. In this case, the respective features can be realized by themselves or as a plurality in combination with one another. The possibilities for solving the problem are not restricted to the exemplary embodiments. Thus, by way of example, range indications always encompass all intermediate values—not mentioned—and all conceivable sub-intervals.

The exemplary embodiments are illustrated schematically in the figures. In this case, identical reference numerals in the individual figures designate elements that are identical or functionally identical or correspond to one another with regard to their functions. In the figures, specifically:

DESCRIPTION OF THE EMBODIMENTS

Figure 1:
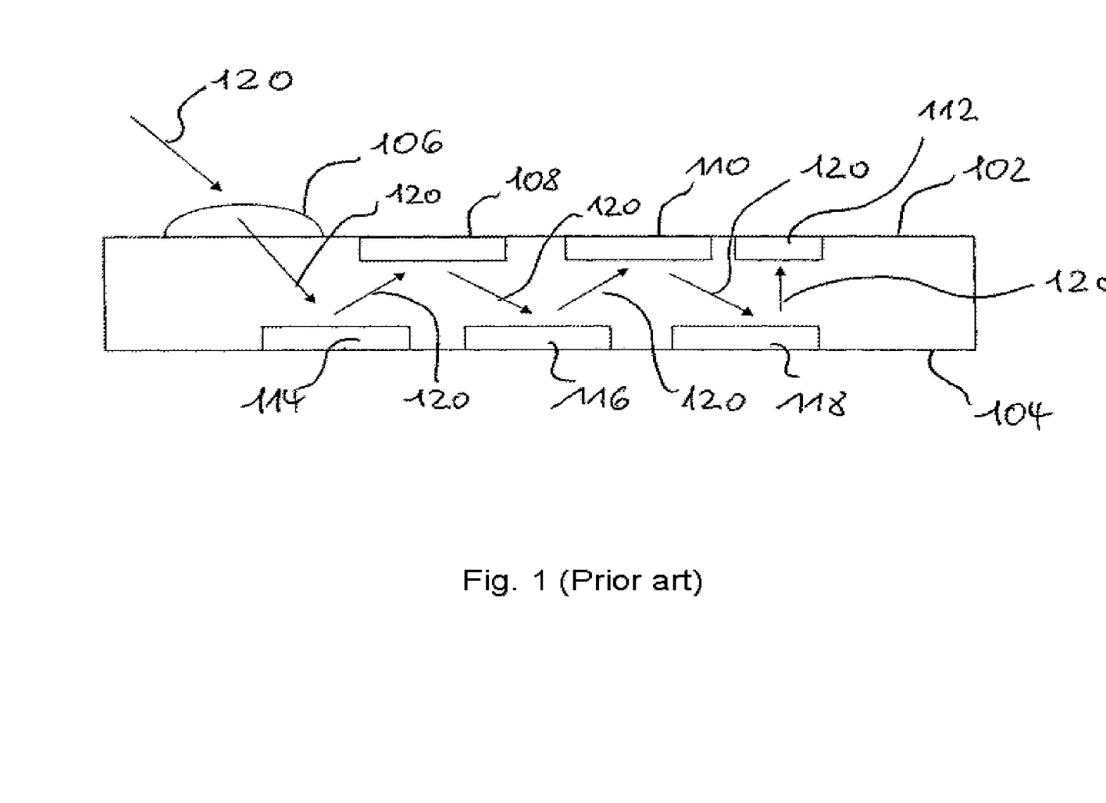
FIG. 1 shows a schematic illustration of an imaging system in accordance with the prior art.

FIG. 1 schematically shows an imaging system 100 corresponding to the known state of the prior art. The system 100 shown has a front side 102 and a rear side 104. A front lens 106, two optical elements 108, 110, and the image sensor 112 are situated at the front side 102. The optical element 114, the optical element 116, and the optical element 118 are arranged opposite at the rear side 104 of the system 100 shown. The optical elements 108, 110, 114, 116 and 118 can be refractive or diffractive, transmissive or reflective optical properties. They are without exception passive optical elements.

The beam path 120 runs from the object (not illustrated) through the front lens 106 to the first optical element 114 further via the second optical element 108, the third optical element 116, the fourth optical element 110 and the fifth optical element 118 to the image sensor 112, on which the object is imaged.

Figure 2:
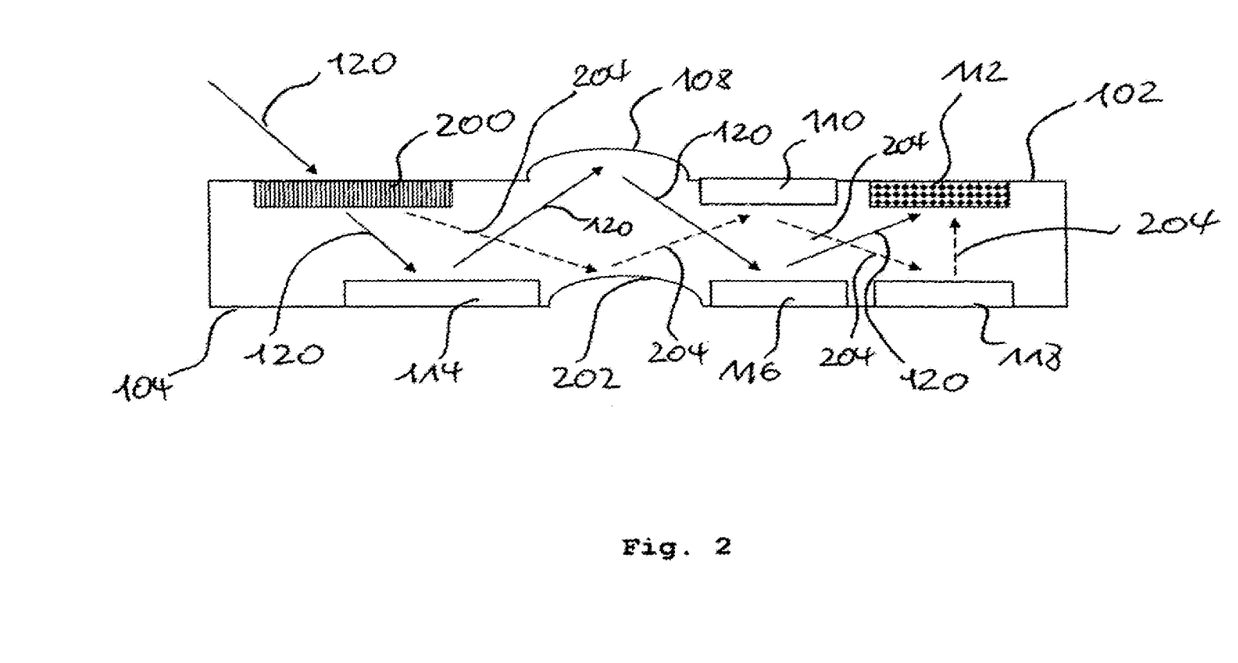
FIG. 2 shows a schematic illustration of an imaging system having a variable focal length.

FIG. 2 schematically illustrates the optical arrangement of an exemplary embodiment of the proposed imaging system 100 (e.g. of a camera module) having a variable focal length.

The system 100 illustrated has a front side 102 and a rear side 104. A light entrance device 200, which has a liquid crystal element, two optical elements 108, 110, and the image sensor 112 is situated at the front side 102. Four optical elements 114, 202, 116 and 118 are arranged opposite at the rear side 104 of the system 100 shown. The optical elements 108, 110, 114, 202, 116 and 118 can be refractive or diffractive, transmissive or reflective, passive or active optical properties.

A first beam path 120 runs from the object (not illustrated) through the light entrance device 200 via the optical elements 114, 108 and 116 to the image sensor 112, on which the object is imaged. This first beam path 120 is defined by a first focal length.

By electrically driving the liquid crystal element of the light entrance device 200, it is possible to bring about a change in the deflection angle of the light radiation emerging from the light entrance device 200, and thus a change in the original beam path 120. The altered beam path 204 thereby realized now runs, proceeding from the light entrance device 200, via the optical elements 202, 110 and 118 to the image sensor 112, on which the object is imaged. This second (altered) beam path 204 is characterized by a second focal length, which deviates from the first.

Consequently, as a result of this changeover between two different beam paths 120 and 204 within the imaging system 100 described, a discretely switchable imaging system having two different focal lengths is realized, for example.

In this case, depending on the structure of the arrangement and of the conductor tracks of the electrodes mounted on the liquid crystal element of the light entrance device 200, and depending on the arrangement of the optical elements in the beam path 120, 204 of the imaging system 100, it is also possible to realize more than two discretely switchable different focal lengths.

Figure 3A:
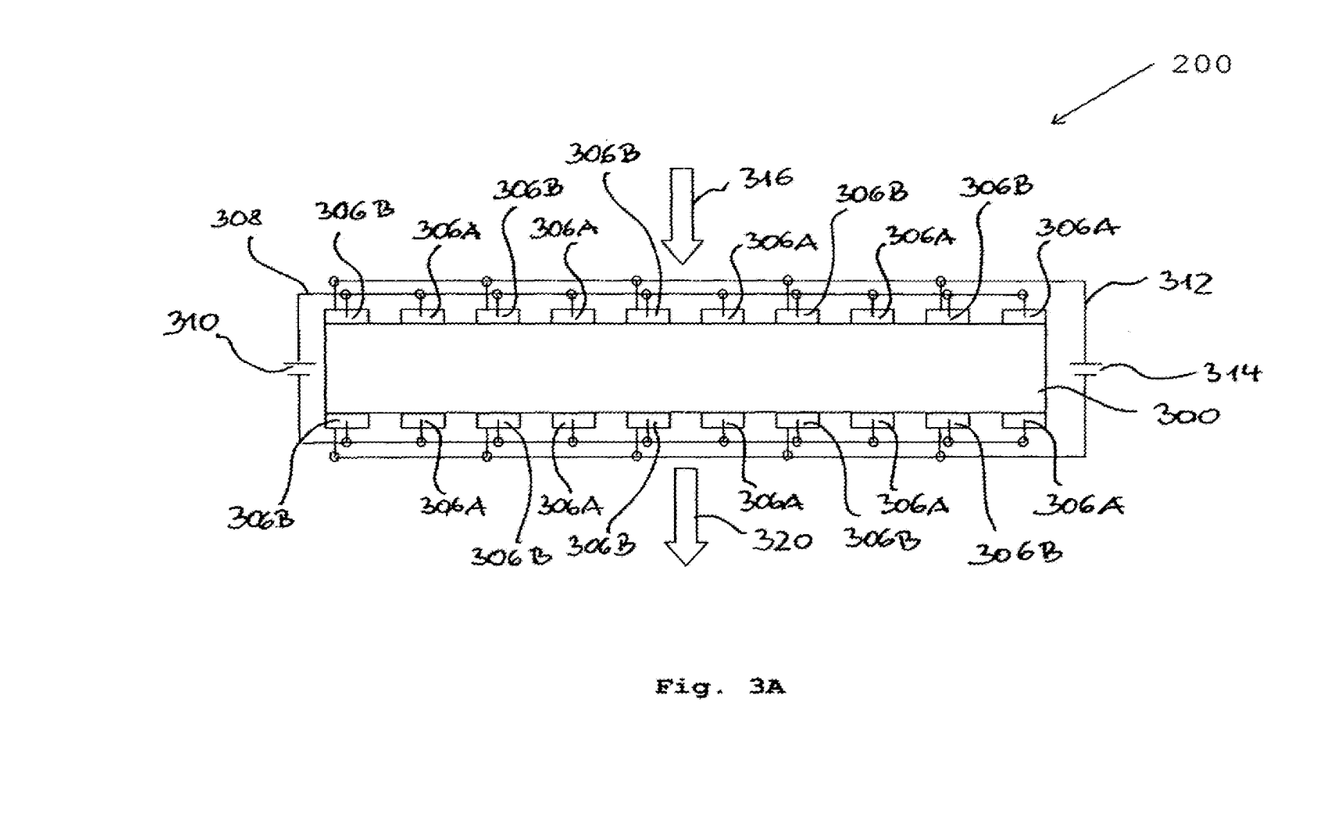
FIG. 3A shows a schematic illustration of the liquid crystal element of the light entrance device for deflecting light rays in the state of the switched-off voltage at the electrodes of two different circuits (group A and group B, respectively)

FIG. 3A schematically illustrates a liquid crystal element 300 of the light entrance device 200. The electrodes 306A, 306B for generating the required electric fields of the liquid crystal element 300 are applied to the frontal surface 302 and the lower surface 304 of the liquid crystal element 300. All of the electrodes 306A, 306B are at a constant identical distance from one another.

The electrodes 306A and 306B are assigned to different circuits. In this case, all of the electrodes 306A and 306B are connected to one another via first conductor tracks 308 supplied by the voltage source 310.

At the same time, the electrodes 306B are connected to one another via a second conductor tracks 312 supplied by the voltage source 314. In this circuit, however, only every second pair of electrodes is connected to the voltage source 314.

The voltage sources 310 and 314 are switched off in the illustration. As a result of this, in the illustration shown, the liquid crystal of the element 300 has an isotropic distribution of the preferred directions. The liquid crystal element 300 has a homogeneous structure with regard to the refractive index in this phase, such that the light radiation 316 can pass through the liquid crystal element 300 without deflection.

Figure 3B:
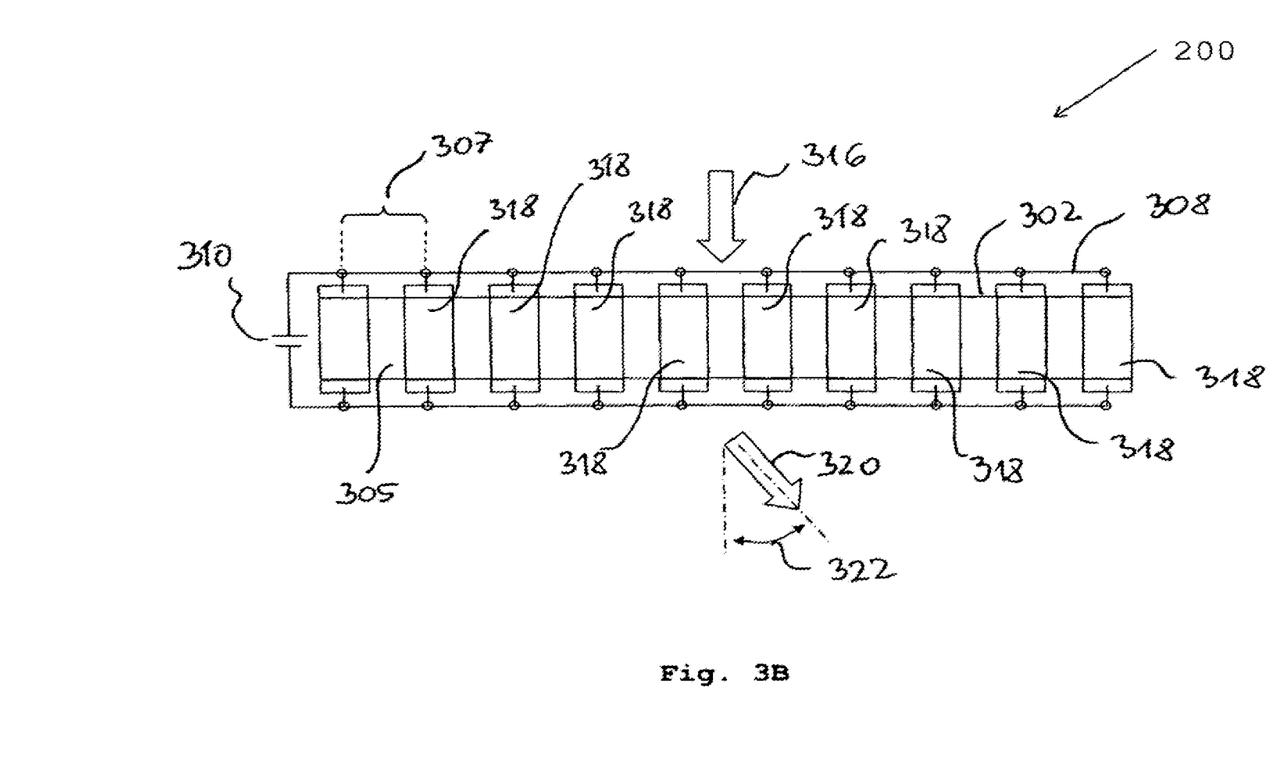
FIG. 3B shows a schematic illustration of the liquid crystal element of the light entrance device for deflecting light rays in the state of the switched-on voltage at a first group A of the electrodes.
Figure 3C:
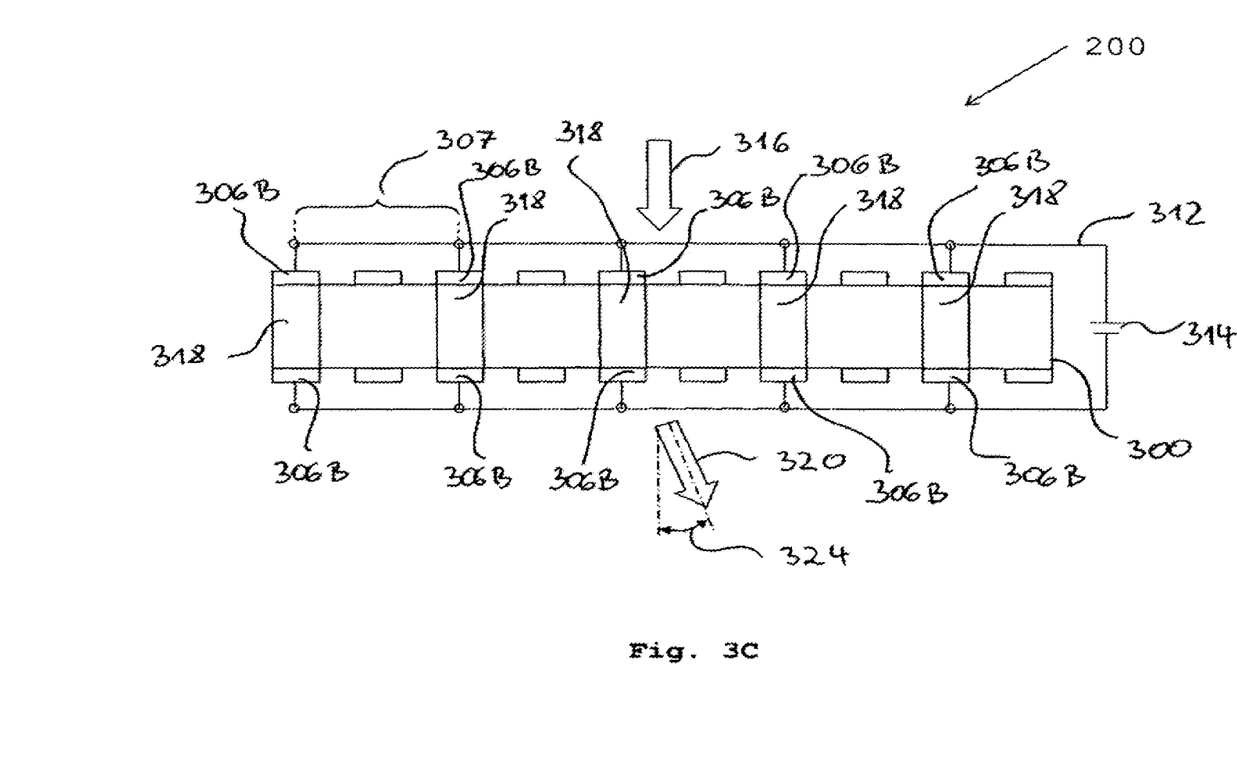
FIG. 3C shows a schematic illustration of the liquid crystal element of the light entrance device for deflecting light rays in the state in the state of the switched-on voltage at a second group B of the electrodes.

FIGS. 3B and 3C schematically show the liquid crystal element 300 respectively with the voltage source 310 and 314 switched on.

In FIG. 3B, as a result of the voltage source 310 being switched on all of the electrodes 306A and 306B are activated via the conductor tracks 308. In this case, in the liquid crystal element 300, in the region of the electric field of the respective electrode pairs between front side 302 and underside 304 of the liquid crystal element 300, regions 318 with strictly ordered alignment of the liquid crystal molecules are produced. These regions 318 have an altered optical refractive index relative to the regions 305 that are not situated in the electric field of the electrodes 306A, 306B.

This configuration of the regions 318 having a defined different refractive index relative to the remaining regions 305 has the effect that the liquid crystal element 300 has the effect of an optical grating having a grating constant g or grating spacing 307.

This electrically produced optical grating results in diffraction of the light radiation at the grating. This causes a deflection (change in direction) of the light radiation 320 after passing through the liquid crystal element 300 at a defined angle 322.

In FIG. 3c, when the voltage source 314 is switched on, only the electrodes 306B in each case are activated. As a result, an optical grating arises in the liquid crystal element 300, said optical grating having a different grating constant 307 than when the voltage source 310 is switched on, since the spacings 307 between the electrodes 306B are greater than the spacings of all the electrodes 306A, 306B in the circuit 308 among one another. This results in a different deflection angle 24 of the emerging light radiation 320 after passing through the liquid crystal element 300.

The exemplary solution illustrated schematically in FIGS. 3A to 3C makes it possible, when using a liquid crystal element 300 and utilizing its optical properties, by means of an electrical switching process, to bring about a different deflection 322 or 324, respectively, of the emerging light radiation 320 after passing through the liquid crystal element 300. As a result, the beam path 120, 204 can be designed such that it is variable within an imaging system 100. In each case different optical elements of the system 100 are included in the beam path 120, 204 and, consequently, two or more different focal lengths of the system 100 can be realized.

Figure 4:
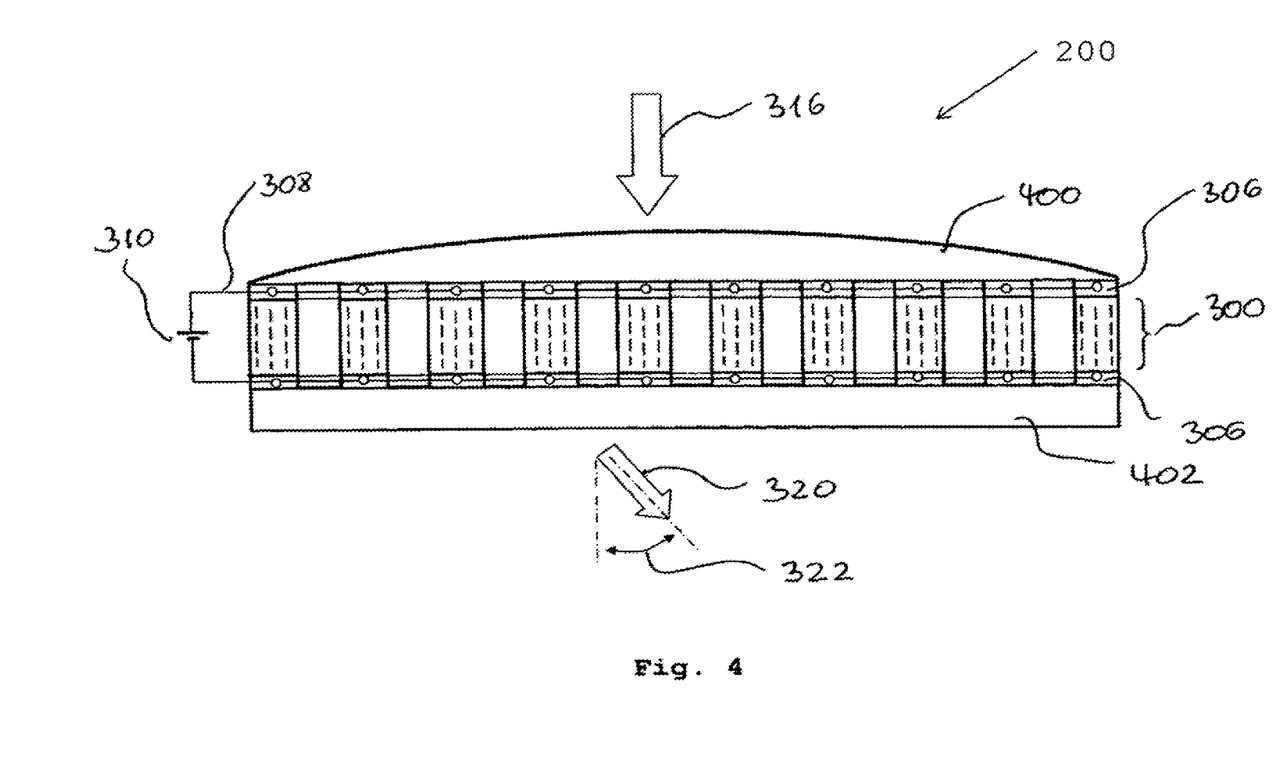
FIG. 4 shows a schematic illustration of the light entrance device in the preferred embodiment of a lens with a liquid crystal element.

The preferred embodiment of the light entrance device 200 illustrated schematically in FIG. 4 has a lens 400 in combination with a liquid crystal element 300. In this case, the liquid crystal element 300 with the ITO electrodes 306 fitted thereto can also be arranged between the lens 400 and a glass plate 402. In the example shown, the beam path of the light radiation 316 entering on the object side is influenced both by the lens 400 and electronically by the switching-on of the voltage source 310. The ITO electrodes 306 are connected to the voltage source 310 via the conductor tracks 308. When the voltage source 310 is switched on, the ITO electrodes 306 are activated and, in addition to the optical effect of the lens 400, the deflection angle 322 of the emerging light radiation 320 is also changed in a manner dependent on the change in the optical properties of the liquid crystal element 300, which is brought about by the activation of the electrodes 306 when the voltage source 310 is switched on, in an analogous manner to that as already described in FIGS. 3A to 3C. The preferred embodiment described here is independent of the polarization direction of the incident light radiation 316.

Figure 5:
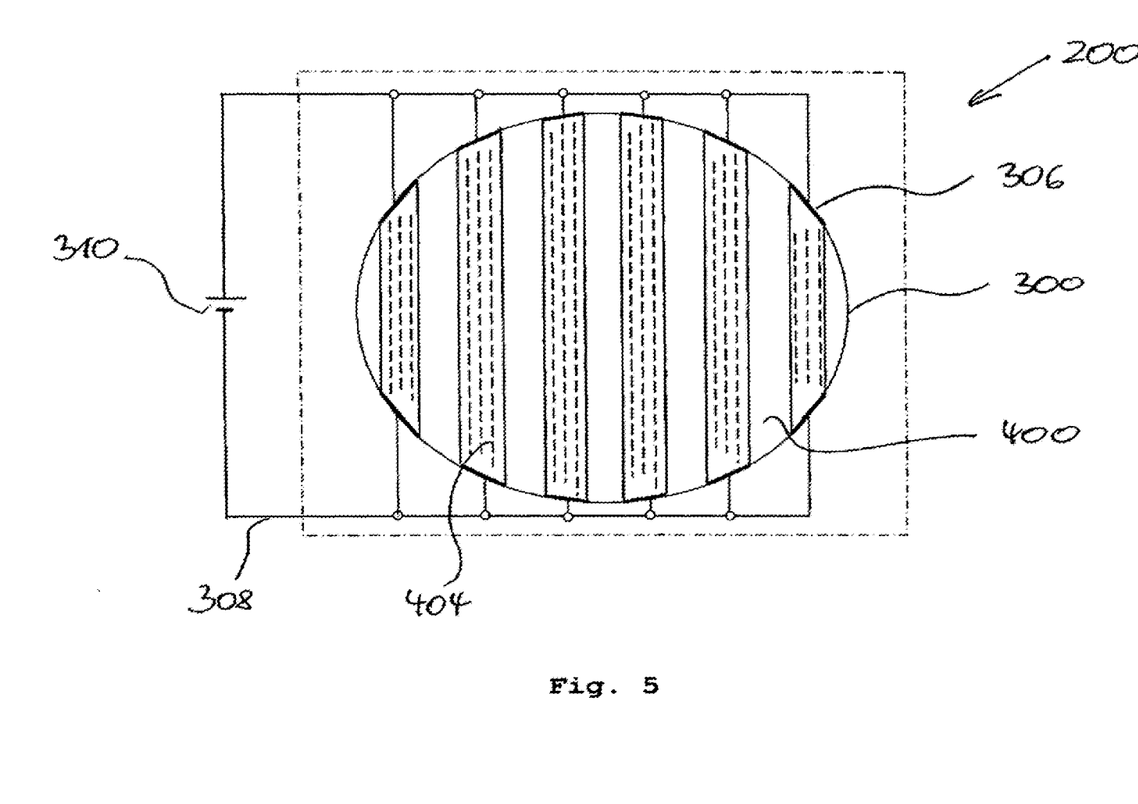
FIG. 5 shows a schematic illustration of the light entrance device in the form of a lens with a liquid crystal element (variant with liquid crystals aligned perpendicular to the optical axis of the lens)

FIG. 5 shows schematically (plan view) a further possible embodiment of a light entrance device 200 with a lens 400 in combination with a liquid crystal element 300. In contrast to FIG. 4, in this variant, the ITO electrodes 306 are arranged laterally on the liquid crystal element 300. The ITO electrodes 306 are likewise connected to the voltage source 310 via the conductor tracks 308. When the voltage 310 is switched on, by means of the electric fields arising between the ITO electrodes 306, the liquid crystals 404 are arranged perpendicular to the optical axis of the lens 400 or propagation direction of the light 316 (see FIG. 3A). Consequently, when the ITO electrodes 306 are activated, an optical grating arises in the liquid crystal element 300, likewise as in FIG. 4, but in this case, the liquid crystals 404 in the regions between the ITO electrodes 306 are aligned perpendicular to the optical axis of the lens 400. This embodiment is characterized, in particular, in that when the voltage 310 is switched, a comparatively large change in the refractive index can be achieved if the incident light radiation 316 (see FIG. 3A) is polarized parallel to the direction of the ordered liquid crystals—or for the correspondingly polarized component of the light. That results in a great dependence for the refractive index (and thus the size of the change angle 322) on the polarization of the incident light 316. Light polarized perpendicular to the alignment of the liquid crystal is partly absorbed and partly deflected. However, the intensity of the deflected part is less than that for the parallel polarization direction. However, the angle is the same for both polarization directions.

Figure 6:
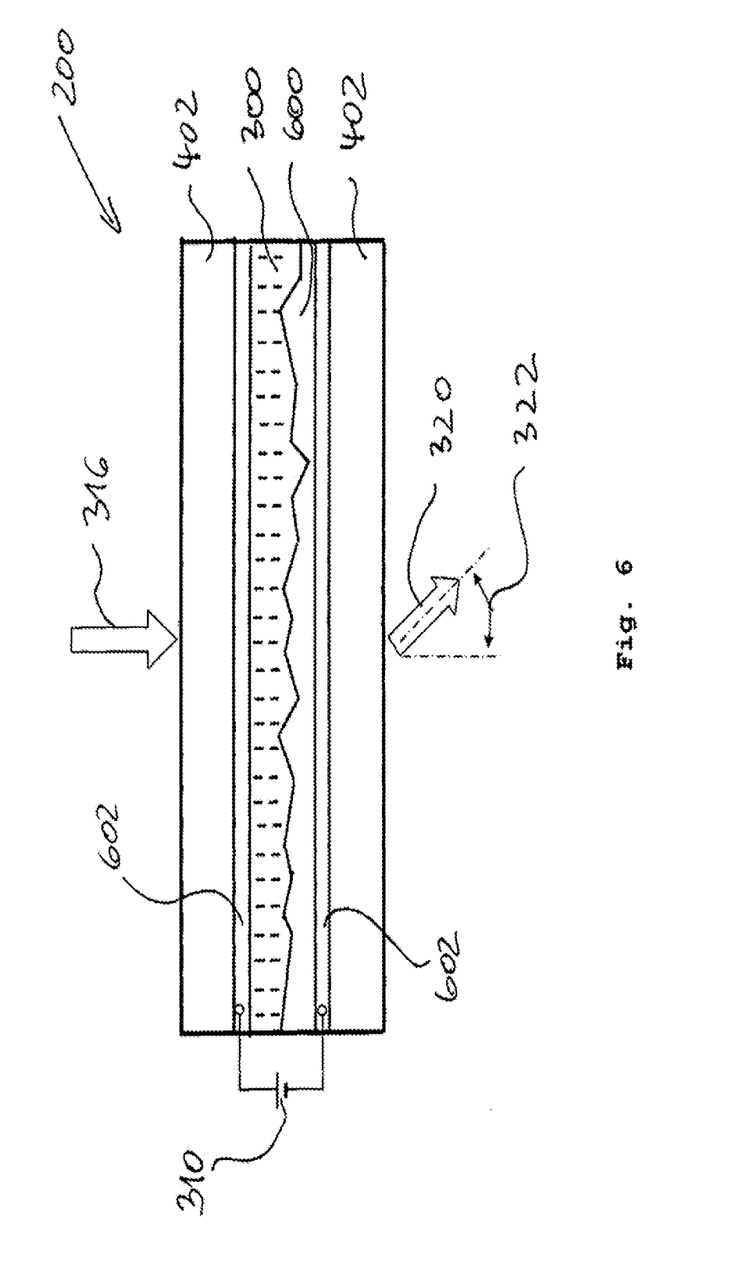
FIG. 6 shows a schematic illustration of the light entrance device with a computer generated hologram (CGH) and a liquid crystal element.

The light entrance device 200 illustrated schematically in FIG. 6 has a liquid crystal element 300 in combination with a computer generated hologram (CGH) 600. The combination of liquid crystal element 300 and CGH 600 is arranged between the ITO surface electrodes 602 fitted on both sides. The CGH 600 can be produced from plastic, for example. A respective glass plate 402 can also be fixed on both sides at the exterior on this arrangement. The beam path of the light radiation 316 entering on the object side is determined by the optical properties both of the liquid crystal element 300 and of the CGH 600. The optical properties (refractive index) of the liquid crystal element 300 are altered electronically by the voltage source 310 being switched on or off, by virtue of the ITO electrodes 602 being activated or deactivated. As a result, the beam path of the emerging light radiation 320 1.e. the deflection angle 322, can be changed electronically. The change in the optical properties of the liquid crystal element 300 by the activation or deactivation of the ITO electrodes 602 is effected in an analogous manner to that already described above.

Figure 7:
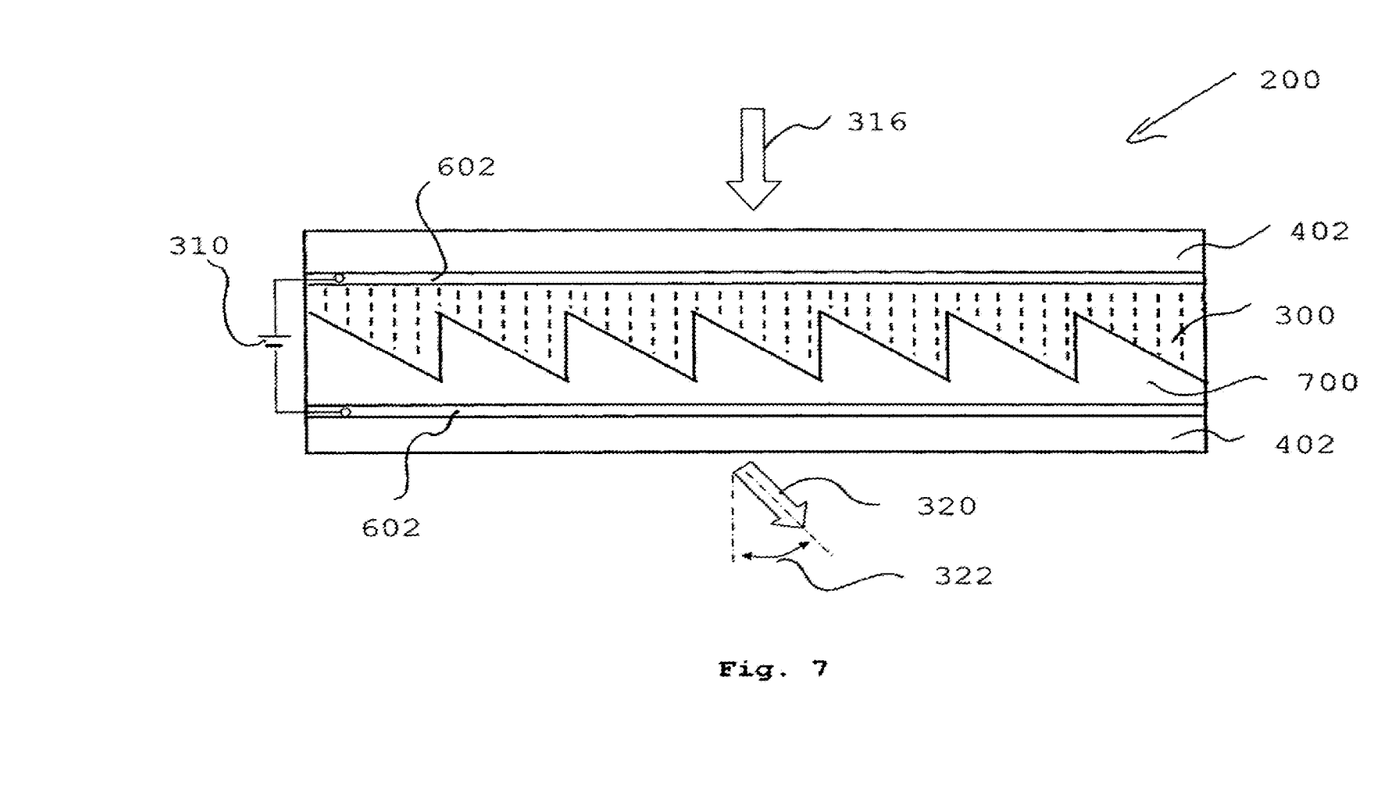
FIG. 7 shows a schematic illustration of the light entrance device with a Fresnel prism and a liquid crystal element.

The light entrance device 200 illustrated schematically in FIG. 7 has a liquid crystal element 300 in combination with a Fresnel prism 700.

The combination of liquid crystal element 300 and Fresnel prism 700 is arranged between the ITO surface electrodes 602 applied at the top and bottom. A respective glass plate 402 can also be present on both sides at the exterior, i.e. at the very top or bottom, on this arrangement. The beam path of the light radiation 316 entering on the object side is determined by the optical properties both of the liquid crystal element 300 and of the Fresnel prism 700. The electronic change in the optical properties (refractive index) of the liquid crystal element 300 is effected in an analogous manner to that in FIG. 6. A deflection 322 of the light beam arises. With the electric field switched off, for example the diffraction structure of the grating is effective; when a suitable electric field is applied, the refractive index of the liquid crystal element changes to the same value as that of the plastic of the Fresnel prism 700 and thus eliminates the deflecting effect.

The degree of alignment of the liquid crystal is dependent on the magnitude of the applied voltage. However, the degree of alignment also determines the extent of the change in the refractive index. The change in the refractive index is thus dependent on the magnitude of the applied voltage. In the case of a Fresnel prim 700, the change in the refractive index influences the deflection angle 322. Therefore, the deflection angle is controllable by way of the magnitude of the applied voltage. This opens up the possibility of realizing further focal lengths.

REFERENCE NUMBERS

100 Imaging system
102 Front side
104 Rear side
106 Front lens
108 Optical element
110 Optical element
112 Image sensor
114 Optical element
116 Optical element
118 Optical element 120 Beam path
200 Light entrance device
202 Optical element
204 Beam path (changed)
300 Liquid crystal element
302 Frontal surface of the liquid crystal element
304 Lower surface of the liquid crystal element
305 Region with nematically pre-oriented liquid crystal molecules
306 ITO electrode
306A ITO electrode (connected to a first voltage source)
306B ITO electrode (connected to a second voltage source)
307 Electrode spacing, grating spacing, grating period
308 Circuit or conductor track of the circuit
310 First voltage source
312 Circuit or conductor track of the circuit
314 Second voltage source 2
316 Entering light radiation (on object side),
318 Region with electrically ordered alignment of the liquid crystal molecules
319 Grating period, grating spacing
320 Emerging light radiation
322 Deflection angle, deflection
324 Deflection angle, deflection
400 Lens
402 Glass plate
404 Aligned liquid crystals
600 Computer generated hologram
602 ITO surface electrode
700 Fresnel prism

The invention claimed is:

1. A variable focal length imaging system for imaging an object onto an image sensor, wherein the imaging system comprises:
a) a front side facing the object;
b) a rear side facing away from the object, said rear side being arranged behind the front side as viewed from the object;
c) a light entrance device at the front side through which light coming from the object can enter into the imaging system;
d) at least one first and one second optical element which are arranged at the rear side in such a way that they can influence the focal length of the beam path within the imaging system; and
d1) an image sensor upon which light from the object passing through the entrance device and along the beam path is imaged;
characterized
e) in that the light entrance device has an electrically switchable liquid crystal element for selectively deflecting the beam path at at least one first angle and a second angle which is different from the at least one first angle, depending on the electrical switching state;
f) wherein the selected beam path impinges on the first optical element at the rear side at the at least one first angle, or on the second optical element at the rear side at the second angle;
g1) wherein when the beam path impinges on the first optical element at the rear side of the imaging system at the at least one first angle, at least a first focal length of the imaging system is obtained, and
g2) wherein when the beam path impinges on the second optical element at the rear side of the imaging system at the second angle, a second focal length different from the at least one first focal length of the imaging system is obtained.

2. A variable focal length imaging system as recited in claim 1,
characterized
in that a periodic grating of regions of a liquid crystal with ordered alignment of liquid crystal molecules can be formed in the liquid crystal element of the light entrance device by an electrical driving arrangement.

3. A variable focal length imaging system as recited in claim 2,
characterized
in that the electrical driving arrangement is embodied in such a way that it can form gratings of regions of the liquid crystal with ordered alignment of the liquid crystal molecules with different grating periods by respectively different driving in the liquid crystal element.

4. A variable focal length imaging system as recited in claim 3,
characterized
in that the light entrance device has a lens and a liquid crystal element.

5. A variable focal length imaging system as recited in claim 3,
characterized
in that the light entrance device has a Fresnel element and a liquid crystal element.

6. A variable focal length imaging system as recited in claim 3,
characterized
in that the light entrance device has a computer generated hologram and a liquid crystal element.

7. A variable focal length imaging system as recited in claim 2,
characterized
in that the light entrance device has a lens and a liquid crystal element.

8. A variable focal length imaging system as recited in claim 2,
characterized
in that the light entrance device has a Fresnel element and a liquid crystal element.

9. A variable focal length imaging system as recited in claim 2,
characterized
in that the light entrance device has a computer generated hologram and a liquid crystal element.

10. A variable focal length imaging system as recited in claim 1,
characterized
in that the light entrance device has a lens and a liquid crystal element.

11. A variable focal length imaging system as recited in claim 1,
characterized
in that the light entrance device has a Fresnel element and a liquid crystal element.

12. A variable focal length imaging system as recited in claim 1,
characterized
in that the light entrance device has a computer generated hologram and a liquid crystal element.

* * * * *